(12) United States Patent
Byers et al.

(10) Patent No.: US 8,166,262 B2
(45) Date of Patent: Apr. 24, 2012

(54) ASSIGNING A PHYSICAL ADDRESS TO A DATA STORAGE DEVICE

(75) Inventors: Daniel J. Byers, Parker, CO (US); Travis Jones, Centennial, CO (US)

(73) Assignee: Quantum Corporation, San Jose, CA (US)

( * ) Notice: Subject to any disclaimer, the term of this patent is extended or adjusted under 35 U.S.C. 154(b) by 463 days.

(21) Appl. No.: 12/506,365

(22) Filed: Jul. 21, 2009

(65) Prior Publication Data

US 2011/0022775 A1  Jan. 27, 2011

(51) Int. Cl.
*G06F 13/00* (2006.01)
(52) U.S. Cl. .............................. 711/161; 711/4; 711/165
(58) Field of Classification Search .............. 711/4, 161, 711/165
See application file for complete search history.

(56) References Cited

U.S. PATENT DOCUMENTS

| | | | |
|---|---|---|---|
| 5,396,596 A * | 3/1995 | Hashemi et al. | 711/113 |
| 5,892,982 A * | 4/1999 | Mitsuda et al. | 710/62 |
| 6,044,442 A * | 3/2000 | Jesionowski | 711/153 |
| 2003/0135580 A1* | 7/2003 | Camble et al. | 709/216 |
| 2005/0080992 A1* | 4/2005 | Massey et al. | 711/114 |

* cited by examiner

*Primary Examiner* — Reba I Elmore
(74) *Attorney, Agent, or Firm* — Baker Botts L.L.P.

(57) ABSTRACT

A method of assigning a physical address to a tape-based data storage device is provided. The method includes receiving a first initialization signal from a system controller at an input port associated with a first tape-based data storage device and prohibiting communication at an output port associated with the first tape-based data storage device. The method further includes providing a first confirmation signal to the system controller in response to receiving the first initialization signal and receiving an instruction from the system controller to enable communication at the output port associated with the first tape-based data storage device in response to the first confirmation signal. The method also includes determining a physical address associated with said first tape-based data storage device based on the instruction from the system controller, the physical address enabling communication at the output port of the first tape-based storage device.

20 Claims, 4 Drawing Sheets

400

```
receiving a first initialization signal from a system controller at an input port
associated with a first tape-based data storage device
410
```
↓
```
prohibiting communication at an output port associated with the first tape-based
data storage device
420
```
↓
```
providing a first confirmation signal to the system controller in response to
receiving the first initialization signal
430
```
↓
```
receiving an instruction from the system controller to enable communication at
the output port associated with the first tape-based data storage device in
response to the first confirmation signal
440
```
↓
```
determining a physical address associated with the first tape-based data storage
device based on the instruction from the system controller, the physical address
enabling communication at the output port of the first tape-based storage device
450
```

FIG. 4

ASSIGNING A PHYSICAL ADDRESS TO A DATA STORAGE DEVICE

BACKGROUND

On many storage devices, for example RAID (Redundant Array of Independent Disks) and tape libraries, assigning a device address is required. For example, in a tape library, tape drives could use a serial number for a unique identity within the tape library. This allows the tape library controller to communicate with any tape drive in the system, but the library controller does not have information on the physical tape drive location.

The host uses the address when commanding the tape library controller to place a tape cartridge into the drive the host needs to use. The tape library controller can communicate with all the tape drives because they have a unique communication address, but the tape library controller does not know where any of the drives are located.

When the tape library controller gets a host command to load a tape cartridge into a drive at specific address, the tape library controller needs to communicate with that specific drive address to get the drive status. The drive status tells the tape library controller information like, whether the drive can be loaded, or if the load completed, or if error conditions exist. Problems arise because the device address does not correspond to a physical location of the device.

In a RAID system, devices which have errors can be identified by blinking the LED of the failed drive. On larger systems with multiple components such as servers, RAID, Ethernet and Fiber Channel switches, the serial number of the component with an error would be indicated on an operator panel. The difficult task of finding the failed device in the large array of devices is then left to the customer engineer.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A method of assigning a physical address to a tape-based data storage device is provided. The method includes receiving a first initialization signal from a system controller at an input port associated with a first tape-based data storage device and prohibiting communication at an output port associated with the first tape-based data storage device. The method further includes providing a first confirmation signal to the system controller in response to receiving the first initialization signal and receiving an instruction from the system controller to enable communication at the output port associated with the first tape-based data storage device in response to the first confirmation signal. The method also includes determining a physical address associated with said first tape-based data storage device based on the instruction from the system controller, the physical address enabling communication at the output port of the first tape-based storage device.

A system for assigning a physical address to a tape-based data storage device is also provided.

DESCRIPTION OF THE DRAWINGS

The accompanying drawings, which are incorporated in and form a part of this specification, illustrate embodiments of the subject matter and, together with the description, serve to explain principles discussed below:

FIG. 4 shows a flow diagram of an exemplary method for assigning an address to a tape-based storage device, according to an embodiment.

Figure 1:
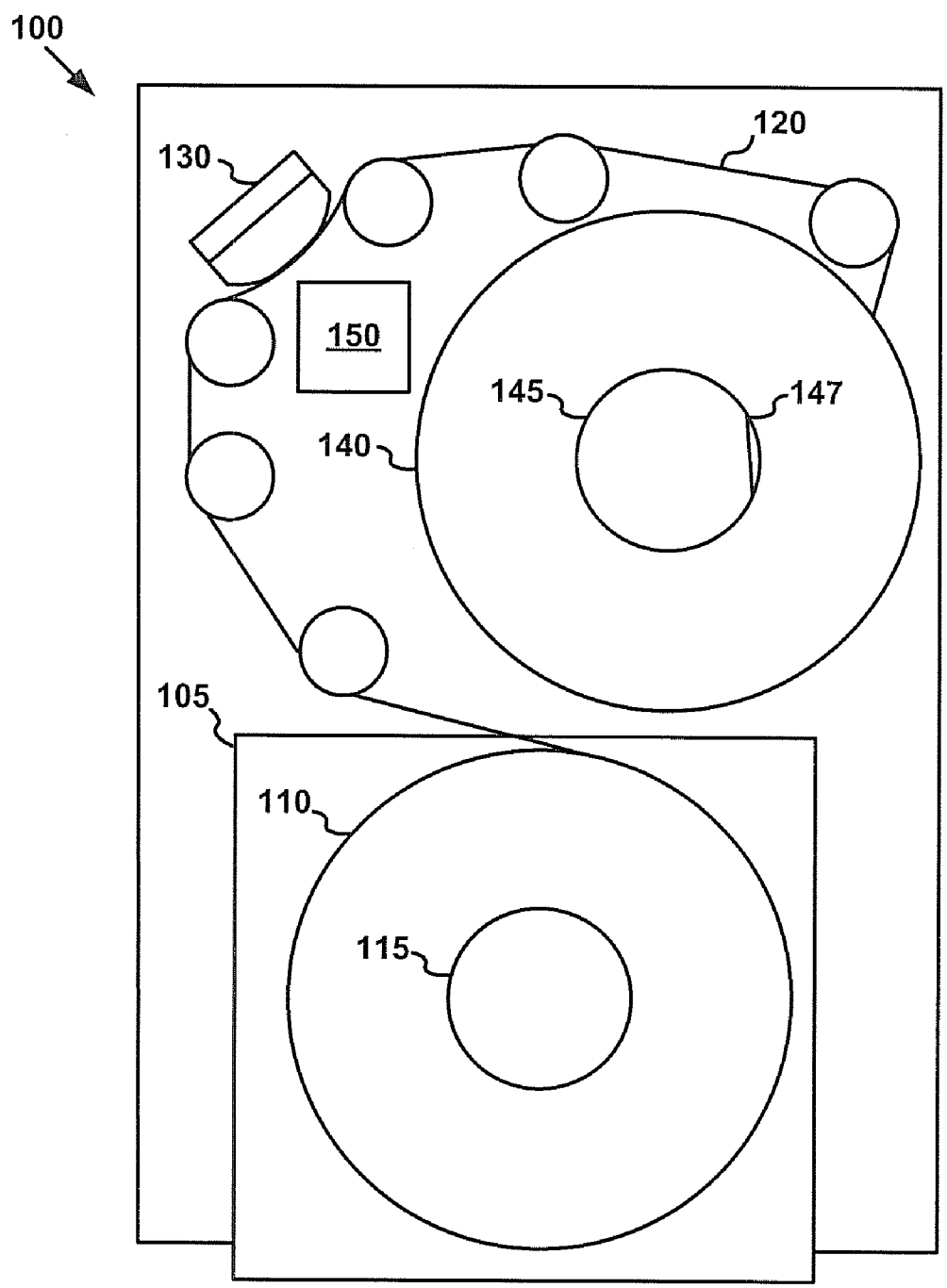
FIG. 1 is a diagram of an example tape drive incorporating an embodiment of the subject matter described herein.

The drawings referred to in this description should be understood as not being drawn to scale unless specifically noted.

DETAILED DESCRIPTION

Reference will now be made in detail to embodiments of the subject matter, examples of which are illustrated in the accompanying drawings. While the subject matter discussed herein will be described in conjunction with various embodiments, it will be understood that they are not intended to limit the subject matter to these embodiments. On the contrary, the presented embodiments are intended to cover alternatives, modifications and equivalents, which may be included within the spirit and scope of the various embodiments as defined by the appended claims. Furthermore, in the following detailed description, numerous specific details are set forth in order to provide a thorough understanding of embodiments of the subject matter. However, embodiments may be practiced without these specific details. In other instances, well known methods, procedures, components, and circuits have not been described in detail as not to unnecessarily obscure aspects of the described embodiments.

Notation and Nomenclature

Unless specifically stated otherwise as apparent from the following discussions, it is appreciated that throughout the detailed description, discussions utilizing terms such as "accessing," "measuring," "correlating," "translating," "determining," "providing," "assigning," "mapping," "utilizing," "outputting," "identifying," "reporting," or the like, refer to the actions and processes of a computer system, measurement module, microcontroller, processor, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. In some embodiments, as described herein, a processor and/or address determiner module resides within and/or is coupled with a tape-based data storage device.

Overview of Discussion

Each device bay within a storage array requires a unique logical and physical address. Within each module, any device bay has a uniquely fixed or hard-wired address to locate it within the module, but the module itself does not have a unique fixed address within the storage array. A unique logical address is needed for direct digital communication to the device within the bay, but a unique physical address is required for physical interaction with the device such as, but not limited to, robotics motion to/from the device, or showing a physical representation of the storage array on a graphical user interface (GUI). For these reasons, correlating the logical and physical addresses for each device is necessary. Further, to avoid human error and minimize system complexity and variation, it is necessary to have each of these addresses assigned automatically within the storage array.

Assigning a unique logical address to any device can be done with many methods, such as, but not limited to, using the device serial number or auto-negotiation of address. Assigning a logical address which corresponds to a physical address complicates the address assignment problem because the mapping between physical and logical addresses must be known.

Embodiments of the present invention disclose a method for automatically assigning physical addresses to devices within a storage array where the storage array is made up of one or more scalable modules and each module may contain multiple storage devices. Embodiments of the present invention automatically assign a unique physical address based on a device's physical location. This unique physical address is used both communication and to locate the device within the system.

Embodiments of the present technology take advantage of the assumption that a cabled communication bus exists between modules and uses the communication as a way to set up and define module addresses. On a per module basis, the bus consists of an "input port" defined as the port where all communication messages come from a system controller and an "output port" where communication messages from the system controller destined for modules beyond a given module exits the module. Embodiments of the present technology also provide a level of intelligence (e.g., microprocessor and/or logic) at the module as an entity that participates in communication.

Discussion will begin with a description of an example tape drive with which, or upon which, embodiments described herein may operate. Discussion will proceed to a description of an example address determiner module for a tape drive, which operates to automatically assign a multi-dimensional physical address to a tape-based data storage device. Components of the address determiner module will be described. Operation of the example address determiner module and its components will then be described in more detail in conjunction with a description of an example method of automatically assigning a multi-dimensional physical address to a tape-based data storage device.

Example Tape Drive

FIG. 1 is a diagram of an example tape drive 100 incorporating an embodiment of the subject matter described herein. Tape drive 100 represents a generic tape drive, and is shown by way of example and not of limitation. It is appreciated that the subject matter described herein is not limited to use with/within tape drive 100, but instead is operable with/within a variety of tape drives. Tape drive 100 is shown with a tape cartridge 105 inserted into tape drive 100. Tape cartridge 105 is removable from tape drive 100, and includes a cartridge reel 110 with a cartridge reel hub 115. Tape 120 is spooled about cartridge reel hub 115 of cartridge reel 110. Tape cartridge 105 supplies tape 120 to tape drive 100. Tape drive 100 includes a drive reel 140 which takes up tape 120 from tape cartridge 105 (when inserted).

A portion of tape 120 (such as a leader) is coupled to drive reel hub 145 by means of a fastening device 147, such as, for example, a grabber or buckler. Fastening device 147 engages tape 120 and then integrates or blends with drive reel hub 145, thereby coupling tape 120 to drive reel hub 145.

During operation of tape drive 100 and drive reel 140, tape 120 is spooled between drive reel 140 and cartridge reel 110 and in the process is guided longitudinally across head 130. Head 130 operates to read data from or write data to tape 120 as tape 120 travels longitudinally in proximity to head 130 while being spooled between drive reel 140 and cartridge feel 110.

Address determiner module 150 enables communication between the drive 100 and a controller or host (not shown) by automatically assigning a physical address to the drive 100. In one embodiment, address determiner module 150 enables communication between the drive 100 and a tape-based storage device (210 of FIG. 2) by automatically assigning a physical address to the drive 100.

Figure 2:
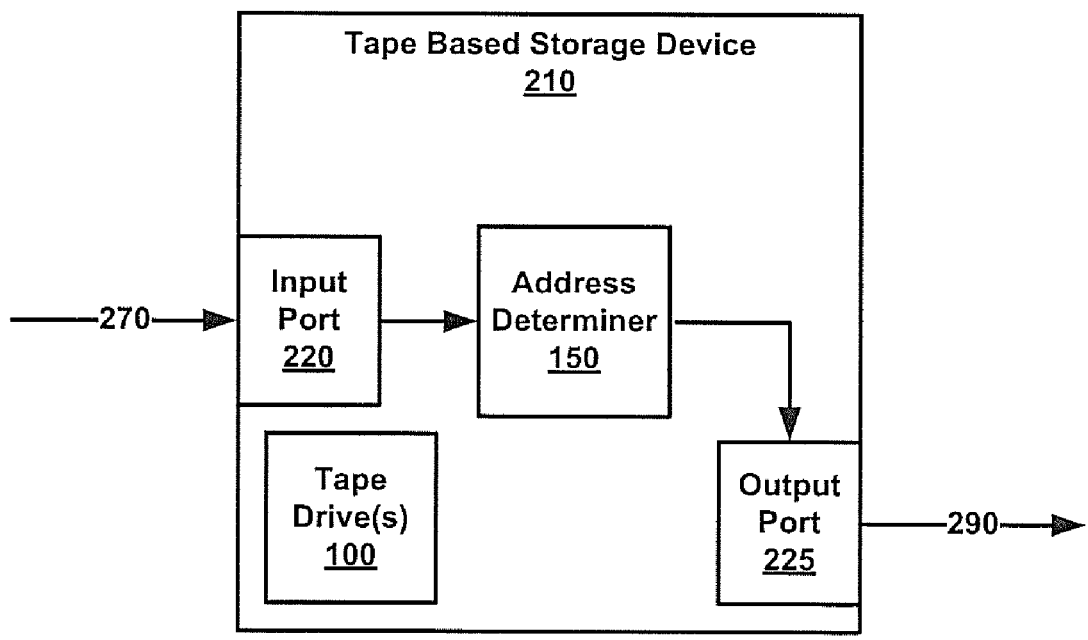
FIG. 2 shows a block diagram of an exemplary tape-based storage device with an address determiner for automatically determining a device address associated with a physical location of a tape-based data storage device, according to an embodiment.

FIG. 2 shows an exemplary tape-based storage device 210 in accordance with embodiments of the present invention. It is appreciated that the tape-based storage device 210 may include one or more tape drives 100 described in FIG. 1. Embodiments of the present technology enable generation of a unique physical and/or logical address for one or more tape-based storage devices 210 using existing communication paths between devices. In one embodiment, in addition to determining an address for the tape-based storage device 210, the address determiner 150 may determine an address for each tape drive 100 residing in the tape-based storage device 210. As described above, each tape drive 100 may also include an address determiner 150 also (not shown in FIG. 2).

In one embodiment, the tape-based storage device 210 includes an input port 220 and an output port 225. The input port 220 receives information 270 from a system controller (not shown). The output port 225 is for passing information 290 to one or more downstream module. In one embodiment, the output port is disabled as a default setting and requires initialization of module 210 prior to enabling communication at output port 225. During initialization of device 210, the address determiner processes data from the system controller and establishes a unique address for device 210. That unique device address is then used to address downstream devices.

Figure 3:
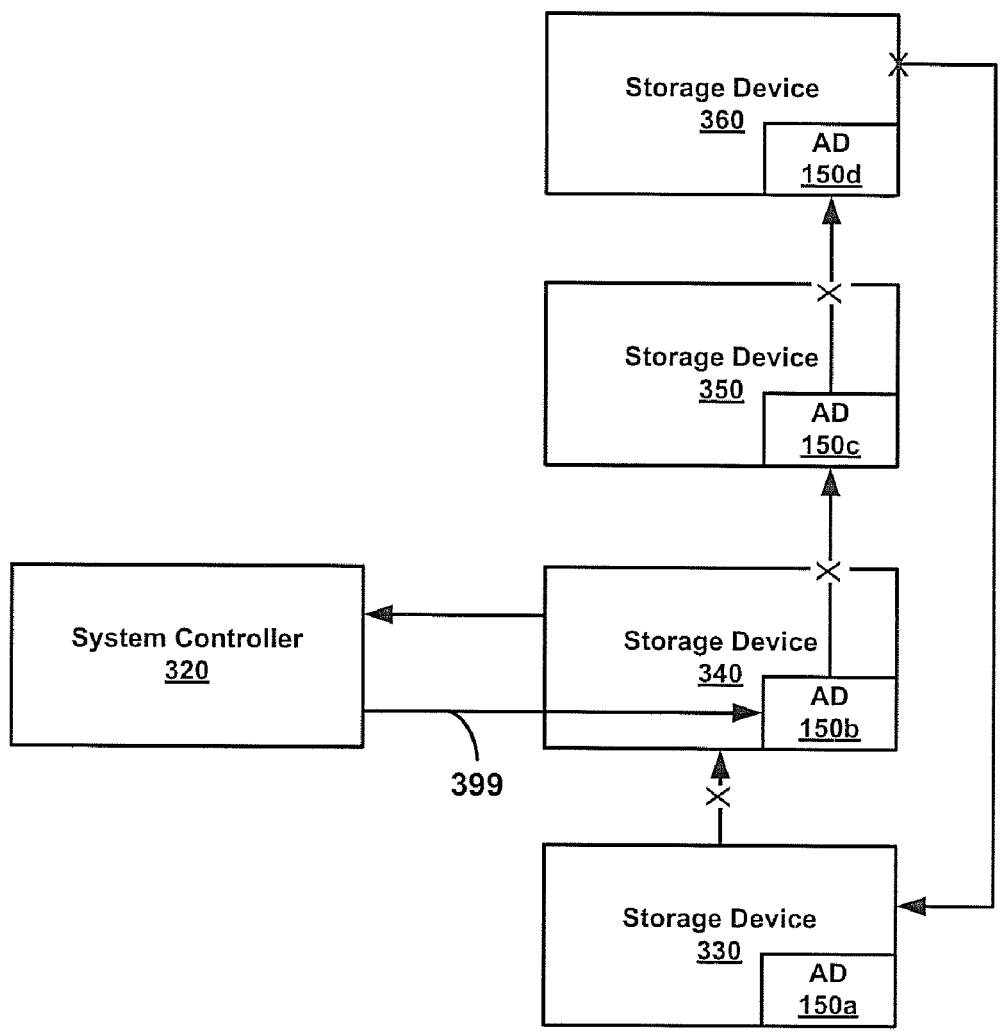
FIG. 3 shows a diagram of a plurality of tape-based storage devices communicating with a system controller, according to an embodiment.

FIG. 3 shows a block diagram of a plurality of tape-based storage devices (330, 340, 250 and 360) coupled with a system controller 320 for automatically determining device addresses in accordance with embodiments of the present invention.

Embodiments of the present invention provide a scalable solution for automatically determining and assigning a unique address for each of the tape-based storage devices (330, 340, 250 and 360) using existing cabling and communication paths. Each module (330, 340, 250 and 360) is configured to have an initial state of blocking communication at its output port but allows communication at an input port. This initial or default state enables communication at a particular device, but prevents communication beyond that particular module. This initial state is represented by the "X" at the output ports of each of the modules.

Initialization is required for a particular module before it is enabled to communicate with modules downstream. In one embodiment, the system controller controls the initialization of the devices. Once in the initial state, the system controller 320 sends a message on bus 399 to search for modules coupled to the bus. The first module accepting the communication on bus 399 is module 340. The initial state of module 340 is to allow incoming communication and to prevent or disable communication at its output port. Once receiving an initialization signal, the module may send a confirmation signal back to the system controller.

In the initial state, device 340 can accept communication from the system controller 320 on its input port but has disabled communication on its output port which prevents communication to devices 350, 360 and 330 (e.g., the downstream devices). While in the initial state, device 340 can communicate with the system controller and take on the first address in the array. Once the address assignment is completed, module 340 will not respond to subsequent initialization requests from the system controller 320. In response to initialization and address assignment, device 340 opens communication on its output port which enables the system controller to communicate with device 350.

Once module 340 is initialized and the output port is opened, the system controller attempts to discover additional devices by sending out an initialization request to device 340, which passes the message to device 350. From that point, the initialization process starts for device 350 and device 340 serves as a communication path between device 350 and the system controller 320.

Once device 350 is initialized, the device 350 sends a confirmation signal back to the system controller. In response, the system controller sends instructions to device 350 to enable communication at its output port and the output port is opened. Once the output port is opened, the system controller attempts to discover additional devices by sending out an initialization request to device 340, which passes the message to device 350, which passes the message to device 360. From that point, the initialization process starts for device 360 and devices 340 and 350 serve as a communication path between device 360 and the system controller 320.

Once device 360 is initialized, and the output port is opened, the system controller attempts to discover additional devices by sending out an initialization request to device 340, which passes the message to device 350, which passes the message to devices 360 and then to device 330. From that point, the initialization process starts for device 330 and devices 340, 350 and 360 serve as a communication path between device 330 and the system controller 320.

Once device 330 is initialized, and the output port is opened, the system controller attempts to discover additional devices by sending out an initialization request to device 340, which passes the message to device 350, which passes the message to device 360, which passes the message to device 330. From that point, the initialization process has already been completed and the message returns to the system controller 320. At that point, device discovery, initialization and addressing is completed for all devices associated with system controller 320.

In one embodiment, multiple system controllers can be coupled, discovered, initialized and addressed as described above.

It is appreciated that address determiner module(s) 150 may reside within a tape-based data storage device or may reside outside a tape-based data storage device. For example, address determiner module 150 may be a stand alone device such as a plug connector for a tape-based data storage device.

Address determiner module 150 samples one or more communication paths electrically coupled to a tape-based storage device to automatically determine an address that corresponds to the physical location of the device with respect to a plurality of devices. In one embodiment, the device address is multi-dimensional and includes location information for two or more dimensions.

Example Methods of Operation

The following discussion sets forth in detail the operation of some example embodiments. With reference to FIG. 4, flow diagram 400 illustrates example procedures used by various embodiments. Flow diagram 400 includes processes that, in various embodiments, are carried out by a processor under the control of computer-readable and computer-executable instructions. The computer-readable and computer-executable instructions for executing the method illustrated by flow diagram 400 reside, for example, in any tangible computer-readable media, such as data storage features internal or external to tape drive 100.

For example, in one embodiment the computer-readable and computer-executable instructions, reside on computer-readable media such as a ROM or firmware of a microcontroller which, is/are used to perform the functions of, or operate in conjunction with, for example, address determiner module 150 of FIGS. 1 and 2. In another example, such computer-readable and computer-executable instructions may reside on a computer-readable storage media such as a diskette (e.g., a Compact Disc Read Only Memory (CD-ROM)) which is used to control operation of a processor in a computer system coupled with tape drive 100.

Although a specific flow of procedures is disclosed in flow diagram 400, such a flow is provided for example. That is, embodiments are well suited to performing various other procedures or variations of the procedures recited in flow diagram 400. It is appreciated that the procedures in flow diagram 400 may be performed in an order different than presented, and that not all of the procedures in flow diagram 400 may be performed in every embodiment.

FIG. 4 shows a flow diagram 400 of an example method of automatically determining an address for a tape-based storage device according to an embodiment. In one embodiment, the method 400 automatically determines a physical address of a tape drive that is unique and directly associated with the physical location of the tape drive.

At 410, 400 includes receiving a first initialization signal from a system controller at an input port associated with a first tape-based storage device. For example, referring back to FIG. 3, a first initialization signal sent from the system controller 320 is received at module 340.

At 420, 400 includes prohibiting communication at an output port associated with the first tape-based storage device. For example, referring back to FIG. 3, communication at the output port is prohibited at module 340. This prohibits communication from reaching module 350.

At 430, 400 includes providing a first confirmation signal to the system controller in response to receiving the initialization signal. Referring back to FIG. 3, Module 340 returns a confirmation signal to the system controller in response to the initialization signal received in 410.

At 440, 400 includes receiving instructions from the system controller to enable communication at the output port associated with the first tape-based storage device in response to the first confirmation signal. Once the confirmation signal is received at module 340, the output port for module 340 is opened to communication.

At 450, 400 includes determining a physical address associated with the first tape-based storage device based on the instructions from the system controller to open the output port which enables communication at the output port of the first tape-based storage device.

Example embodiments of the subject matter are thus described. Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of assigning a physical address to a tape-based data storage device, said method comprising:
   receiving a first initialization signal from a system controller at an input port associated with a first tape-based data storage device;
   prohibiting communication at an output port associated with said first tape-based data storage device;
   providing a first confirmation signal to said system controller in response to receiving said first initialization signal;
   receiving an instruction from said system controller to enable communication at said output port associated with said first tape-based data storage device in response to said first confirmation signal; and
   determining a physical address associated with said first tape-based data storage device based on said instruction from said system controller, said physical address enabling communication at said output port of said first tape-based storage device.

2. The method of claim 1 further comprising:
   disabling said output port associated with said first tape-based data storage device as a default setting.

3. The method of claim 1 further comprising:
   receiving a second initialization signal from said system controller at said input port associated with said first tape-based data storage device;
   providing said second initialization signal at said output port associated with said first tape-based data storage device; and
   receiving said second initialization signal at said second tape-based storage device.

4. The method of claim 3 further comprising:
   prohibiting communication at an output port associated with said second tape-based data storage device;
   providing a first confirmation signal to said system controller in response to receiving said second initialization signal;
   receiving an instruction from said system controller to enable communication at said output port associated with said second tape-based data storage device in response to said first confirmation signal; and
   determining a physical address associated with said second tape-based data storage device based on said instruction from said system controller to enable communication at said output port of said second tape-based storage device.

5. The method of claim 4 further comprising:
   receiving a signal at said system controller from said output port of said second tape-based storage device;
   determining initialization is complete; and
   generating a mapping of said first and second tape-based storage devices based on said addresses.

6. The method of claim 5 further comprising:
   configuring a robot motion profile based on said mapping.

7. The method of claim 1 further comprising:
   determining a plurality of tape drive addresses based on said physical address associated with said first tape-based data storage device.

8. A computer readable storage medium comprising instructions that when executed, cause a computer system to perform a method of assigning a physical address to a tape-based data storage device, said method comprising:
   receiving a first initialization signal from a system controller at an input port associated with a first tape-based data storage device;
   prohibiting communication at an output port associated with said first tape-based data storage device;
   providing a first confirmation signal to said system controller in response to receiving said first initialization signal;
   receiving an instruction from said system controller to enable communication at said output port associated with said first tape-based data storage device in response to said first confirmation signal; and
   determining a physical address associated with said first tape-based data storage device based on said instruction from said system controller.

9. The computer implemented method of claim 8 wherein said method further comprises:
   disabling said output port associated with said first tape-based data storage device as a default setting.

10. The computer readable storage medium of claim 8 wherein said method further comprises:
    receiving a second initialization signal from said system controller at said input port associated with said first tape-based data storage device;
    providing said second initialization signal at said output port associated with said first tape-based data storage device; and
    receiving said second initialization signal at said second tape-based storage device.

11. The computer readable storage medium of claim 10 wherein said method further comprising:
    prohibiting communication at an output port associated with said second tape-based data storage device;
    providing a first confirmation signal to said system controller in response to receiving said second initialization signal;
    receiving an instruction from said system controller to enable communication at said output port associated with said second tape-based data storage device in response to said first confirmation signal; and
    determining a physical address associated with said second tape-based data storage device based on said instruction from said system controller to enable communication at said output port of said second tape-based storage device.

12. The computer readable storage medium of claim 11 wherein said method further comprises:
    receiving a signal at said system controller from said output port of said second tape-based storage device;
    determining initialization is complete; and
    generating a mapping of said first and second tape-based storage devices based on said addresses.

13. The computer readable storage medium of claim 12 wherein said method further comprises:
    configuring a robot motion profile based on said mapping.

14. The computer readable storage medium of claim 8 wherein said method further comprises:
    determining a plurality of tape drive addresses based on said physical address associated with said first tape-based data storage device.

15. A system for assigning a physical address to a tape-based data storage device comprising:
    an input port associated with a first tape-based data storage device configured to receive a first initialization signal from a system controller;

a port controller configured to block communication at an output port associated with said first tape-based data storage device;

a confirmation signal generator for providing a first confirmation signal to said system controller in response to said first initialization signal;

in response to receiving an instruction from said system controller, said port controller further configured to enable communication at said output port associated with said first tape-based data storage device; and an address determiner configured for determining a physical address associated with said first tape-based data storage device based on said instruction from said system controller, said address enabling communication at said output port of said first tape-based storage device.

16. The system of claim 15 wherein said output port is coupled to a second tape-based data storage device.

17. The system of claim 15 wherein communication at said output port associated with said first tape-based data storage device is blocked as a default setting.

18. The system of claim 15 wherein said input port or said output port is an Ethernet port.

19. The system of claim 15 wherein said first tape-based data storage device comprises a plurality of tape drives.

20. The system of claim 15 further comprising:

a device mapper for generating a device map indicating a location of said first tape based storage device based on said physical address.

* * * * *